(12) United States Patent
Cheung

(10) Patent No.: US 10,072,823 B2
(45) Date of Patent: Sep. 11, 2018

(54) LASER-POINTING DEVICE

(71) Applicant: LICC Manufacturing Company (Far East) Ltd., Hong Kong (HK)

(72) Inventor: Ying Cheung, Hong Kong (HK)

(73) Assignee: LICC MANUFACTURING COMPANY (FAR EAST) LTD., Hong Kong (HK)

( * ) Notice: Subject to any disclaimer, the term of this patent is extended or adjusted under 35 U.S.C. 154(b) by 0 days.

(21) Appl. No.: 15/414,557

(22) Filed: Jan. 24, 2017

(65) Prior Publication Data

US 2017/0130936 A1    May 11, 2017

Related U.S. Application Data

(63) Continuation of application No. 15/005,026, filed on Jan. 25, 2016, now Pat. No. 9,581,315.

(60) Provisional application No. 62/149,660, filed on Apr. 19, 2015.

(51) Int. Cl.
| | |
|---|---|
| *F21V 19/02* | (2006.01) |
| *F21V 14/02* | (2006.01) |
| *F21V 15/01* | (2006.01) |
| *G02B 27/20* | (2006.01) |
| *G02B 26/10* | (2006.01) |

(52) U.S. Cl.
CPC ............ *F21V 14/025* (2013.01); *F21V 15/01* (2013.01); *G02B 27/20* (2013.01); *G02B 26/10* (2013.01)

(58) Field of Classification Search
CPC ....... F21V 14/025; F21V 15/01; G02B 27/20; G02B 26/10
See application file for complete search history.

(56) References Cited

U.S. PATENT DOCUMENTS

| | | | | | |
|---|---|---|---|---|---|
| 5,803,582 | A | * | 9/1998 | Huang | G02B 27/20 362/109 |
| 6,000,813 | A | * | 12/1999 | Krietzman | G02B 27/20 353/110 |
| 2005/0128749 | A1 | * | 6/2005 | Wilson | G02B 27/20 362/259 |
| 2009/0092161 | A1 | * | 4/2009 | Hung | G02B 26/105 372/29.01 |

FOREIGN PATENT DOCUMENTS

CN        203786945 U   *   8/2014

* cited by examiner

*Primary Examiner* — Evan Dzierzynski
*Assistant Examiner* — Naomi M Wolford

(57) ABSTRACT

A laser-pointing device includes a housing having a front opening, a laser-generating mechanism for generation of a pointing light beam through the front opening, a support member movably supporting the laser-generating mechanism in the housing, a controller, and a drive mechanism connected with the laser-generating mechanism and used for driving the laser-generating mechanism to move along a predetermined track in the housing under control of the controller.

16 Claims, 5 Drawing Sheets

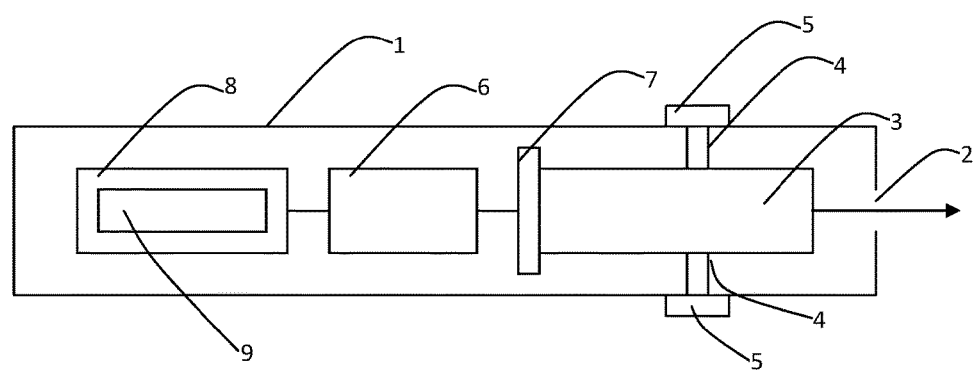
FIG. 1
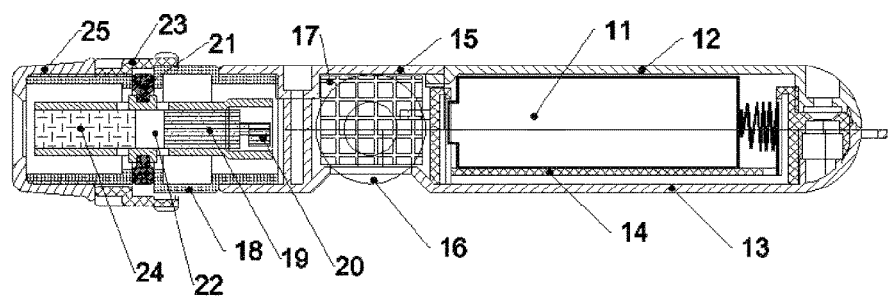
FIG. 2
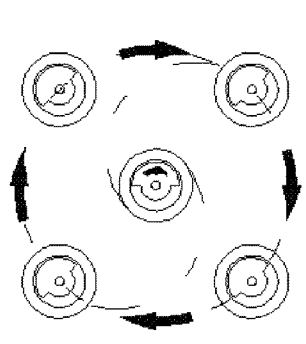      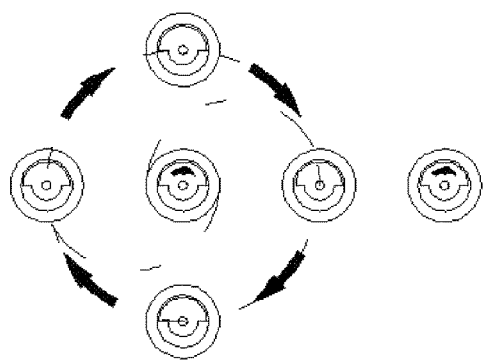
FIG. 3a      FIG. 3b      FIG. 3c

LASER-POINTING DEVICE

CROSS-REFERENCE TO RELATED APPLICATIONS

This application is a Continuation Application of U.S. patent application Ser. No. 15/005,026 filed on Jan. 25, 2016 which claims the benefit of U.S. Provisional Patent Application No. 62/149,660, filed Apr. 19, 2015, the entire content of which is hereby incorporated by reference.

FIELD OF THE TECHNOLOGY

The present application relates to laser-pointing technology, and particularly to a laser-pointing device having multiple pointing modes.

BACKGROUND

In occasion such as speech/lecture where there are a lot of audiences, a speaker usually needs to project the content of the speech/lecture on a screen or present it on a blackboard. Moreover, the speaker also needs a pointing device to point at the content of the speech/lecture and draw the audience's attention.

Laser-pointing devices have been invented to assist speakers to point at content of a speech/lecture. A laser pointer is a common laser-pointing device. A laser pointer has an outer appearance of a ball-point pen. A light-emitting diode is provided on the laser pointer. When electricity is supplied, the light-emitting diode will emit light, such as a red pointing beam from a front end of the laser pointer. A speaker can point the content of the speech/lecture to the attention of the audience.

However, the pointing mode of the currently existing laser-pointing device is rather simple. The pointing mode of a laser pointer is usually a single dot of light. When a speaker needs to point at a content that covers a region, the speaker usually needs to continuously move the laser-pointing device. This is inconvenient to the speaker. Since the dot of light would disappear immediately, the pointing effect is quite limited.

SUMMARY

According to one aspect, there is provided a laser-pointing device including: a housing having a front opening; a laser-generating mechanism accommodated in the housing, the laser-generating mechanism being used for the generation of a pointing light beam emitting along a longitudinal axis of the housing, through the front opening, and out of the housing; a support member accommodated in the housing, the support member being used for movably supporting the laser-generating mechanism in the housing; a controller accommodated in the housing; and a drive mechanism accommodated in the housing and controlled by the controller, the drive mechanism being connected with the laser-generating mechanism and being used for driving the laser-generating mechanism to carry out movement along a predetermined track in the housing under control of the controller.

In one embodiment, the housing may be further provided with a movement-restricting member, wherein when the movement-restricting member is in a movement-restricting position, the movement-restricting member engages with the laser-generating mechanism and restricts the movement thereof along the predetermined track, and when the movement-restricting member is not in the movement-restricting position, the movement-restricting member withdraws movement restriction on the laser-generating mechanism.

In one embodiment, the support member may include an elastic body provided on an outer wall of the laser-generating mechanism. The movement-restricting member may be in the form of a press mechanism slidably provided on the housing. The press mechanism can be used for exerting a force on the elastic body when the press mechanism slides onto the elastic body.

In one embodiment, the laser-generating mechanism may be cylindrical in shape. The elastic body may be in the form of an annular gasket sleeved around a cylindrical outer wall of the laser-generating mechanism. The press mechanism can be slidably sleeved around an outer periphery of the annular gasket.

In one embodiment, the laser-generating mechanism may include a front end from which the light beam emits and a corresponding rear end. The drive mechanism may be provided at the rear end of the laser-generating mechanism.

In one embodiment, the drive mechanism may include an electric motor and an eccentric wheel connected with the electric motor. The electric motor can be controlled by the controller and can be used for driving the eccentric wheel to move in a circle, thereby driving the rear end of the laser-generating mechanism to carry out circular motion in a radial direction of the housing.

In one embodiment, the controller may include a drive voltage regulator circuit for regulating the drive voltage transmitted to the drive mechanism.

In one embodiment, the drive voltage regulator circuit may include a slide resistor, and the housing may be provided with a roller-type switch. The roller-type switch can be used to select one of a plurality of contact points of the slide resistor so as to regulate the drive voltage transmitted to the drive mechanism.

In one embodiment, a battery compartment may be provided in the housing for the accommodation of a battery. The battery provides a working power source to the controller, the drive mechanism as well as the laser-generating mechanism.

In one embodiment, the housing may be in the form an elongated cylinder. The controller may be provided on a printed circuit board, and wherein the laser-generating mechanism, the printed circuit board and the battery compartment are disposed in an order from the front end of the housing.

BRIEF DESCRIPTION OF THE DRAWINGS

Specific embodiments of the laser-pointing device will now be described by way of example with reference to the accompanying drawings wherein:

FIG. 1 is a block diagram of an embodiment of the laser-pointing device of the present application.

FIG. 2 is a cross sectional view showing an embodiment of the structure of the laser-pointing device of the present application.

FIGS. 3a-3c show the drive mechanism and the operation mode of the drive mechanism.

DETAILED DESCRIPTION

Figure 4:
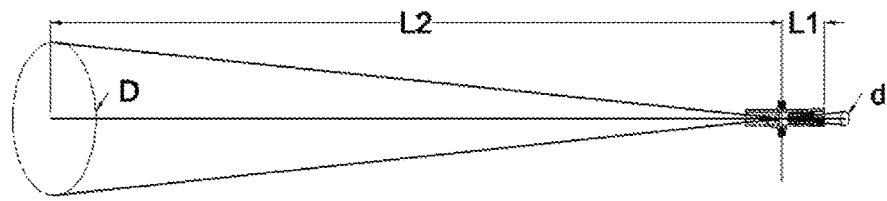
FIG. 4 shows the operation of the laser-generating mechanism and the corresponding relationship with the pointing light beam.

Although the laser-pointing device is shown and described with respect to certain embodiments, it is obvious that equivalents and modifications will occur to others skilled in the art upon the reading and understanding of the specification. The laser-pointing device in the present application includes all such equivalents and modifications, and is limited only by the scope of the claims.

As shown in FIG. 1, an embodiment of the laser-pointing device of the present application may include: a housing 1 having a front opening 2; a laser-generating mechanism 3 accommodated in the housing 1, the laser-generating mechanism 3 being used for the generation of a pointing light beam emitting along a longitudinal axis of the housing 1, through the front opening 2, and out of the housing 1; a support member 4 accommodated in the housing 1, the support member 4 being used for movably supporting the laser-generating mechanism 3 in the housing 1; a controller 6 accommodated in the housing 1; and a drive mechanism 7 accommodated in the housing 1 and controlled by the controller 6, the drive mechanism 7 being connected with the laser-generating mechanism 3 and being used for driving the laser-generating mechanism 3 to carry out movement along a predetermined track in the housing 1 under control of the controller 6.

The housing 1 may be in the form an elongated cylinder. A user can easily hold the laser-pointing device by one hand. The housing 1 can be a hollow unitary part. However, to facilitate the assembly of the laser-generating mechanism 3, the housing 1 may include detachable separate parts. For example, the housing 1 may include separable bottom housing and top housing. Each of the bottom and top housings may have a semi-cylindrical accommodating space. At the time of assembly, the laser-generating mechanism 3 may first be put inside the bottom housing, and the top housing may then be snap-fitted on the bottom housing. Hence, the laser-generating mechanism 3 can be accommodated inside a cylindrical accommodating space defined by the top and bottom housings.

To facilitate movement of the laser-generating mechanism 3 inside the housing 1, the diameter of the laser-generating mechanism 3 can be smaller than the diameter of the housing 1, and the laser-generating mechanism 3 can be supported inside the accommodating space of the housing 1 by the support member 4. Apart from the portion being supported by the support member 4, the other portions (non-supporting portions) of the laser-generating mechanism 3 may be suspended in the accommodating space inside the housing 1 such that, using the supporting portion as a fulcrum, the non-supporting portions can carry out motion along the predetermined track inside the housing 1.

The movement of the non-supporting regions of the laser-generating mechanism 3 can be driven by the drive mechanism 7. The drive mechanism 7 can be controlled by the controller 6. Under the control of the controller 6, the drive mechanism 7 can drive the laser-generating mechanism 3 to move along the predetermined track. For example, the predetermined track can be a circle.

Still referring to FIG. 1, the laser-pointing device may further include a movement-restricting member 5. The movement-restricting member 5 may be slidably mounted on an outer side of the support member 4, and thus coupled with the laser-generating mechanism 3. The movement-restricting member 5 can press on the support member 4 and then press on the laser-generating mechanism 3 via the support member 4, thereby limiting movement of the laser-generating mechanism 3 along the predetermined track. The movement-restricting member 5 can be moved away from the outer side of the support member 4 such that the movement-restricting member 5 is not pressing on the support member 4. To facilitate portable usage, the laser-pointing device may adopt built-in battery to supply working power source to various electronic components in the housing 1. As illustrated in FIG. 1, the housing 1 may be provided with a battery compartment 8. A No. 5 battery 9, for example, may be held within the battery compartment 8. Obviously, the battery can be other type of battery, e.g. button cell battery, or single-use battery, or rechargeable battery.

FIG. 2 shows the detailed structure of an embodiment of the laser-pointing device of the present application. To facilitate assembly of the internal components, the housing 1 of the laser-pointing device can be separately formed. The housing may include a rear bottom housing 13 with a battery compartment 14 provided therein. A battery 11 can be held inside a battery compartment 14. A battery cover 12 can be snap-fitted on the rear bottom housing 13 to thereby cover the battery compartment 14 from an upper portion thereof. The battery cover 14 can be detachably connected to the rear bottom housing 13 by fastening means such as screws.

The battery compartment 14 may be disposed in a rear space of the rear bottom housing 13. A printed circuit board (PCB) 17 may be provided in a front space of the rear bottom housing 13, i.e. on a front side of the battery compartment 14. The controller 6 shown in FIG. 1 may be provided on the PCB 17. A roller-type switch 16 may be connected with the controller 6 on the PCB 17, and protruding from a portion of the rear bottom housing 13 allowing a user to turn the laser-pointing device on or off. A rear top cover 15 may be snap-fitted on the rear bottom housing 13 from an upper portion thereof to thereby cover a front space of the PCB 17.

The housing 1 may further include a front housing 18 which is detachably connected with the rear bottom housing 13 and the rear top cover 15. Similarly, the front housing 18 may be divided into a front bottom housing and a front top housing, which may be detachably connected with the rear bottom housing 13 and the rear top cover 15 respectively. The detachable connection may include small holes formed on the front bottom housing and the front top housing, and protruding rods formed on the rear bottom housing 13 and the rear top cover 15 for insertion into the small holes respectively. The laser-generating mechanism 3 may be accommodated in the front housing 18, i.e. the laser-generating mechanism 3 is disposed at the front side of the PCB 17. As illustrated in FIG. 2, the laser-generating mechanism 3 may include a laser generator 24 for the generation of a pointing light beam, and a cartridge 22 for storing the laser generator 24. The cartridge 22 may be cylindrical in shape. The front housing 18 may be provided therein with a support member 21 for suspendably supporting the cartridge 22 on the outer wall thereof in the space inside the front housing 18. A movement-restricting member 23 may be slidably provided on an outer wall of the front housing 18. The front housing 18 may be formed with an opening such that when the movement-restricting member 23 slides to a movement-limiting position, the movement-restricting member 23 can be in touch with the support member 21 to thereby press on the support member 21. The movement-restricting member 23 can also slide to a position that is not movement-limiting so that the movement-restricting member 23 is not pressing on the support member 21. A front end cover 25 may be fitted on a front side of the front housing 18 for protecting the laser generator 24 from a front side thereof. The support member 21 may be an elastic body made of plastic or other elastic material. As shown in FIG. 2, the elastic body can be an annular gasket sleeved around a cylindrical outer wall of the cartridge 22. The movement-restricting member 23 can be in the form of a press mechanism that can press and deform the elastic body. The press mechanism can be slidably sleeved around an outer periphery of the annular gasket.

The laser generator 24 may be provided at a front end of the cartridge 22, and the drive mechanism 7 may be provided inside the cartridge 22 at a rear end thereof, i.e. behind the laser-generating mechanism 3 (relative to the front end from which the pointing light beam emits). The drive mechanism 7 may include an electric motor 19 and an eccentric wheel 20 connected with the electric motor 19. The electric motor 19 can be controlled by the controller 6, and can be used for driving the eccentric wheel 20 to move in a circle. Referring to FIGS. 3a, 3b and 3c, the eccentric wheel 20 may be in the form of a semicircular-shaped metal wheel. When the eccentric wheel 20 is driven by the electric motor 19 to move in a circle, then due to centrifugal force of the eccentric wheel 20, the rear end of the cartridge 22 is driven to carry out circular motion in a radial direction of the housing.

Referring to FIG. 4, it can be seen that the motion of the laser-generating mechanism 3 at the rear end thereof and the motion at the pointing region of the pointing light beam have a proportional relationship: $D=L2/L1*d$, wherein d is the diameter of the circular motion of the rear end of the laser-generating mechanism 3, L1 is the distance from the rear end of the laser-generating mechanism 3 to a fulcrum (i.e. the portion of the laser-generating mechanism 3 being supported by the support member 4), and L2 is the distance from the end point of the pointing light beam (the point where the pointing light beam contacts the content of the speech/lecture on a screen/blackboard) to the fulcrum. D is the diameter of the corresponding circular motion at the end point of the pointing light beam when driven by the movement of the rear end of the laser-generating mechanism 3. Since L2 is usually larger than L1, hence a little circular motion of the rear end (i.e. the rear end of the cartridge 22) of the laser-generating mechanism can render the pointing light beam to create a relatively large circular motion at the pointing region.

Figure 5:
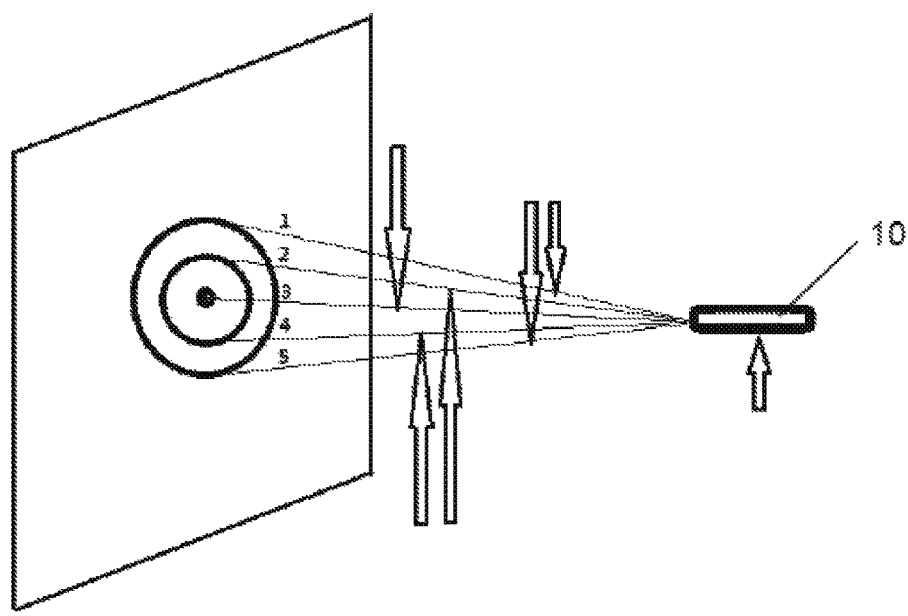
FIG. 5 shows an embodiment of the pointing mode of the laser-generating mechanism of the present application.

Referring to FIG. 5, although the actual physical characteristic of the pointing light beam is a dot of light moving in a circle (corresponding to the moving track at the rear end of the laser-generating mechanism 3) at the pointing region. However, in eyes of a human being, the visual effect is a circular ring of light appearing at the pointing region. As we all know, eyes of a human being have the effect of persistence of vision. When pictures are continuously displayed in a speed of 24 frames or more per second, a person will have a perception of a continuous image even though it is a number of pictures. With this effect, when the rear end of the laser-generating mechanism 3 moves in a sufficient speed, e.g. an electric motor speed of 7500 cycles/second, and a dot of light has appeared at a position on a track, this dot of light is still considered to be existing because of the effect of persistence of vision of the eyes of a human being. Therefore, the visual effect in the eyes of a human being would be a circular ring of light. As illustrated in FIG. 5, when the laser-generating mechanism 3 is not moving, the laser-pointing device 10 displays a dot of light at the pointing region. When the laser-generating mechanism 3 makes a small movement, the laser-pointing device 10 displays a relatively small circular ring of light at the pointing region; and when the laser-generating mechanism 3 makes a large movement, the laser-pointing device 10 displays a relatively large circular ring of light at the pointing region.

Figure 6A:
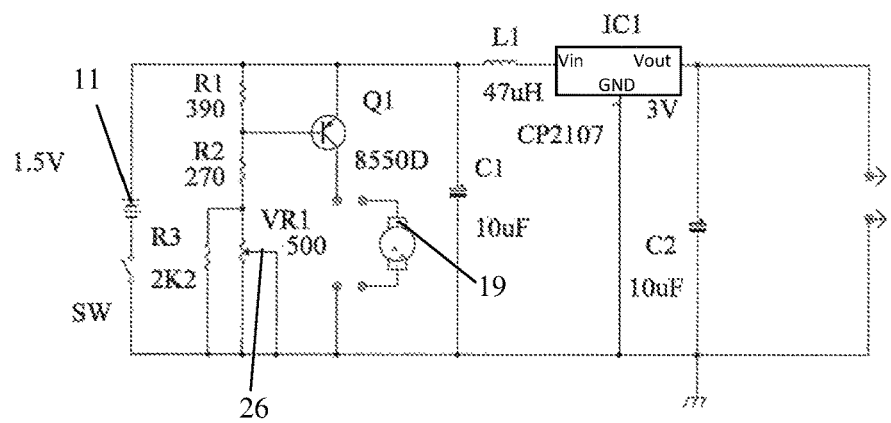
FIGS. 6a-6c are circuit diagrams of the controller.
Figure 6B:
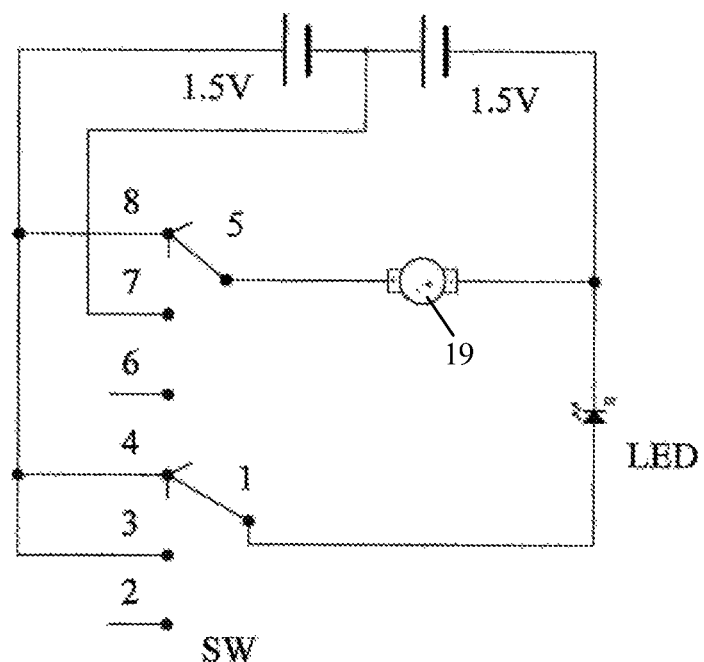
Figure 6C:
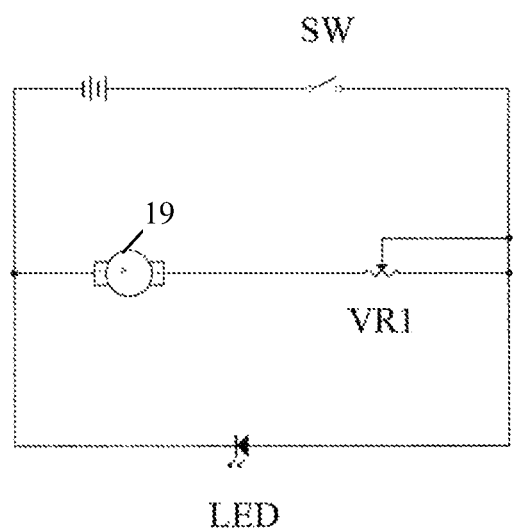

FIGS. 6a-6c show circuit diagrams of the controller on the PCB 17. As shown in the figures, the battery 11 supplies working power source to the controller 6. The controller 6 may include a drive voltage regulator circuit. The drive voltage regulator circuit can be used for regulating the drive voltage transmitted to the electric motor 19 of the drive mechanism 7. As shown in the figures, the drive voltage regulator circuit may include a slide resistor 26, a roller-type switch 16 can be used to select one of a plurality of contact points of the slide resistor 26 so as to regulate the drive voltage transmitted to the electric motor 19. The circuit of the controller 6 can also provide power source to the laser generator 24.

Figure 7A:
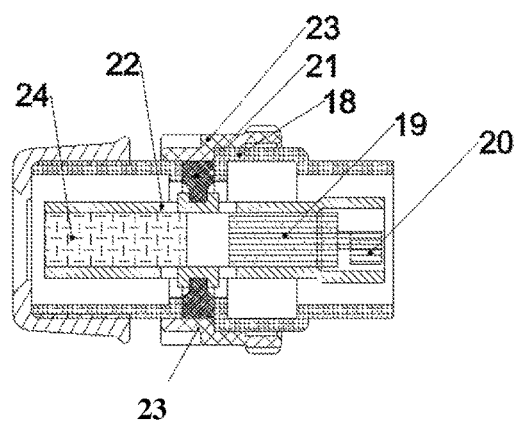
FIGS. 7a and 7b show the movement-restricting member being disposed in a movement-restricting position, and its corresponding force distribution respectively.
Figure 7B:
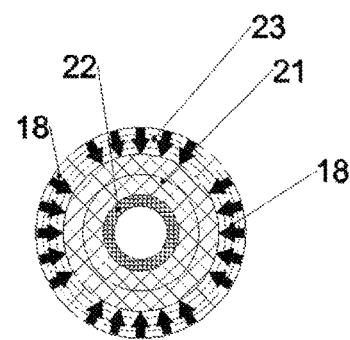

Referring to FIGS. 7a, 7b, 8a and 8b, the effect of the electric motor 19 and the eccentric wheel 20 causes the cartridge 22 to move along the predetermined track inside the front housing 18. For example, a circular motion of the rear end of the cartridge 22 causes the front end of the laser generator 24 to carry out a corresponding circular motion such that the dot of light at the pointing region moves along a circular track, and the display effect in the eyes of a human being is a circular ring of light. In another aspect, the support member 21 can be pressed by the movement-restricting member 23 such that the cartridge 22 is pressed by the support member 21 through the supporting portion thereof. This can change the moving track of the cartridge 22, thereby changing the mode of the circular ring of light. Referring to FIG. 9, the movement-restricting member 23 may be in the form of a hollow platform-type cylinder. A platform-type cylinder is a cylinder with its diameters being distributed in a platform-type manner. For example, the movement-restricting member 23 can be divided into two sections according to their diameters. A front section may have a smaller diameter, and a rear section may have a larger diameter. The outer wall of the front housing may be provided with an annular projection corresponding with the rear section of the movement-restricting member 23. During assembly, the front end cover 25, the movement-restricting member 23, the cartridge 22 with the support member 21 sleeved around the outer wall thereof, and the front housing 18 may be assembled along the longitudinal axis of the housing 1. Referring to FIG. 7a, when the movement-restricting member 23 slides along the front housing 18 until the rear section of smaller diameter covers the outer side of the support member 21, the movement-restricting member 23 is in the movement-limiting position where the movement-restricting member 23 engages with and presses on the support member 21. In the embodiment where the support member 21 is an elastic body, the elastic body deforms under pressure. The deforming force presses onto the cartridge 22 through the supporting portion, and the movement of the cartridge 22 is limited. As shown in FIG. 7a, the support member 21 is preset such that the support member 21 can be pressed from the left and right sides thereof. When the movement-restricting member 23 moves to the movement-limiting position, the movement-restricting member 23 presses onto the support member 21 from the upper and lower sides thereof so that the force on the support member 21 can be even. As illustrated in FIG. 7b, the finally appeared display effect is a circular ring of light.

Figure 8A:
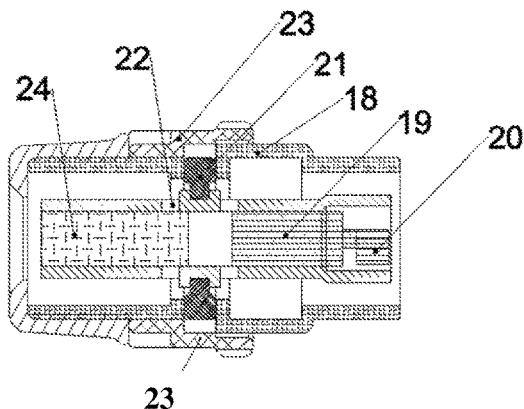
FIGS. 8a and 8b show the movement-restricting member not being disposed in a movement-restricting position, and its corresponding force distribution respectively.
Figure 8B:
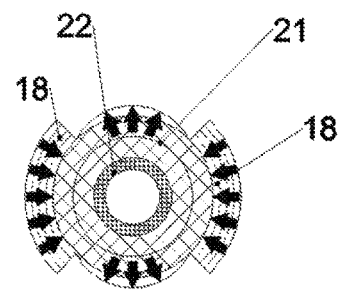
Figure 9:
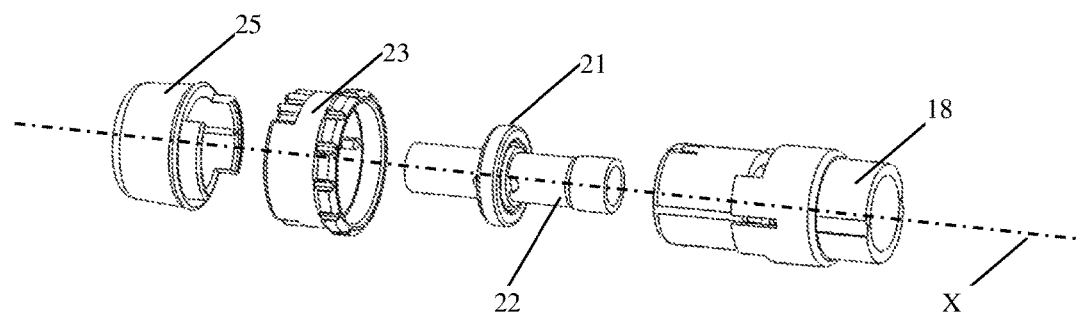
FIG. 9 is an exploded view of some parts of the laser-pointing device.

Similarly, as shown in FIG. 8a, when the movement-restricting member 23 is moved forwards from the front housing 18, the front section having a smaller diameter moves away from the outer side of the support member 21. Since the rear section has a larger diameter, it is no longer in contact with the support member 21, and hence it is no longer pressing on the support member 21. At this moment, the movement-restricting member 23 is no longer in the movement-limiting position. At this time, as shown in FIG. 8b, the support member 21 only withstands the preset pressure on the left and right sides thereof such that the upper and lower sides are no longer under pressure. The finally appeared display effect is an oval-shaped light. Obviously, it is also possible that no preset pressure is applied on the support member 21. It is understood that any other suitable movement-limiting method can be adopted so long as it can limit the movement of the laser-generating mechanism 3 along the predetermined track so as to change the pointing mode of the laser-pointing device.

Figure 10:
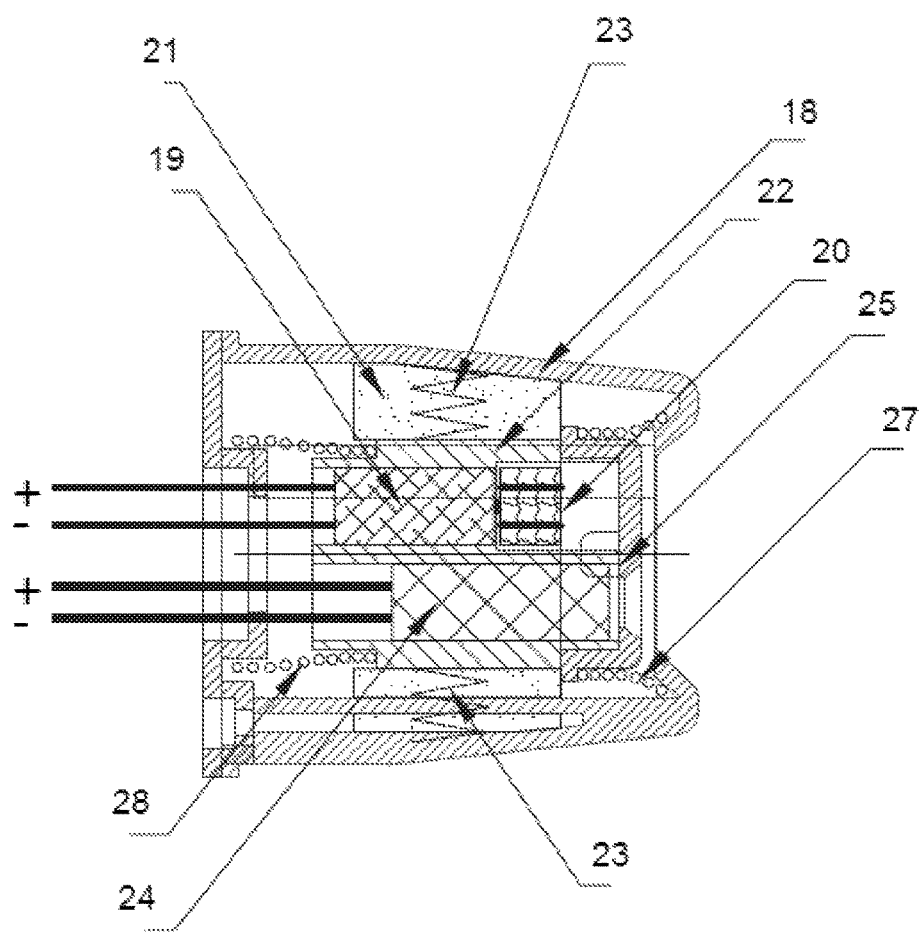
FIG. 10 is a cross sectional view showing another embodiment of the laser-pointing device of the present application.

As shown in FIG. 10, the laser-pointing device of the present application can be in the form of a cylinder having a larger diameter and a shorter length so as to coordinate with the installation of other internal components of the device. The cartridge 22 can be supported in the housing 1 by using a front end elastic member (such as a spring) 27 and a rear end elastic member 28. The electric motor 19 and a movement-causing member 20 may be provided above the laser generator 24 instead of behind it. Under the driving force of the electric motor 19, the movement-causing member 20 can cause the laser generator 24 to move along a predetermined track such that the dot of light can move along the predetermined track at the pointing region to thereby produce a display effect of a circular ring of light in the eyes of a human being. Similarly, the front end cover 25 can protect the laser generator 24 from a front end thereof. The support member 21 and the movement-restricting member 23 can support and limit the movement of the cartridge 22 respectively.

In the laser-pointing device of the present application, the laser-generating mechanism can carry out movement along a predetermined track in the housing such that the pointing light beam generates a corresponding movement. Hence, the pointing mode of the laser-pointing device is no longer restricted to a dot of light. For example, a pointing mode such as a circular ring of light can be formed. Therefore, a speaker is no longer requires to move his/her pointing device continuously when the content to be pointed out is a region. This can facilitate the speaker and provide a better display effect to the audience. The pointing mode can have further changes through predetermined limitation the movement of the laser-generating mechanism. For example, circular ring of light or oval-shaped light can be formed in the eyes of a human being.

While the laser-pointing device has been shown and described with particular references to a number of preferred embodiments thereof, it should be noted that various other changes or modifications may be made without departing from the scope of the appended claims.

What is claimed is:

1. A laser-pointing device comprising:
a housing having a front opening;
a laser-generating mechanism accommodated in the housing, the laser-generating mechanism being used for generation of a pointing light beam emitting along a longitudinal axis of the housing, through the front opening, and out of the housing;
a support member accommodated in the housing, the support member being used for movably supporting the laser-generating mechanism in the housing;
a controller accommodated in the housing; and
a drive mechanism accommodated in the housing and controlled by the controller, the drive mechanism being connected with the laser-generating mechanism and being used for driving the laser-generating mechanism to carry out movement along a predetermined track in the housing under control of the controller;
wherein the laser-generating mechanism comprises a front end from which the light beam emits and a corresponding rear end, the drive mechanism being provided at the rear end of the laser-generating mechanism; and
wherein the drive mechanism comprises an electric motor and an eccentric wheel connected with the electric motor, the electric motor being controlled by the controller and used for driving the eccentric wheel to rotate to generate a centrifugal force, thereby driving the rear end of the laser-generating mechanism to carry out the movement along the predetermined track in a radial direction of the housing;
wherein the housing is further provided with a movement-restricting member, wherein when the movement-restricting member is in a movement-restricting position, the movement-restricting member engages with the laser-generating mechanism and restricts the movement thereof along the predetermined track, and when the movement-restricting member is not in the movement-restricting position, the movement-restricting member withdraws movement restriction on the laser-generating mechanism.

2. The laser-pointing device as claimed in claim 1, wherein the support member is preset to be pressed from left and right sides of the support member; when the movement-restricting member is in the movement-limiting position, the movement-restricting member presses onto the support member from upper and lower sides of the support member; the press forces on the support member from the left, right, upper and lower sides are even.

3. The laser-pointing device as claimed in claim 1, wherein the support member comprises an elastic body provided on an outer wall of the laser-generating mechanism, and the movement-restricting member is in the form of a press mechanism slidably provided on the housing, the press mechanism being used for exerting a force on the elastic body when the press mechanism slides onto the elastic body.

4. The laser-pointing device as claimed in claim 3, wherein the elastic body is made of plastic.

5. The laser-pointing device as claimed in claim 3, wherein the laser-generating mechanism is cylindrical in shape, the elastic body is in the form of an annular gasket being sleeved around a cylindrical outer wall of the laser-generating mechanism, and the press mechanism is slidably sleeved around an outer periphery of the annular gasket.

6. The laser-pointing device as claimed in claim 1, wherein a front end cover is fitted on a front side of the front housing for protecting the laser-generating mechanism from a front side of the laser-generating mechanism.

7. The laser-pointing device as claimed in claim 1, wherein the electric motor drives the eccentric wheel to move in a circle, thereby driving the rear end of the laser-generating mechanism to carry out circular motion in the radial direction of the housing.

8. The laser-pointing device as claimed in claim 7, wherein when the movement-restricting member is in a movement-restricting position, the movement-restricting member restricts the rear end of the laser-generating mechanism to move along an oval track.

9. The laser-pointing device as claimed in claim 1, wherein the eccentric wheel is in the form of a semicircular-shaped metal wheel.

10. The laser-pointing device as claimed in claim 1, wherein the controller comprises a drive voltage regulator circuit, the drive voltage regulator circuit being used for regulating the drive voltage transmitted to the drive mechanism.

11. The laser-pointing device as claimed in claim 10, wherein the drive voltage regulator circuit comprises a slide resistor, and the housing is provided with a roller switch, wherein the roller switch is used to select one of a plurality of contact points of the slide resistor so as to regulate the drive voltage transmitted to the drive mechanism.

12. The laser-pointing device as claimed in claim 1, wherein a battery compartment is provided in the housing for accommodation of a battery, and the battery provides a working power source to the controller, the drive mechanism as well as the laser-generating mechanism.

13. The laser-pointing device as claimed in claim 12, wherein the housing is in the form an elongated cylinder, the controller being provided on a printed circuit board, and wherein the laser-generating mechanism, the printed circuit board and the battery compartment are disposed in an order from the front end of the housing.

14. The laser-pointing device as claimed in claim 1, wherein the housing comprises a bottom housing and a top housing each having a semi-cylindrical accommodating space.

15. The laser-pointing device as claimed in claim 1, wherein the movement-restricting member is in the form of a hollow cylinder having a front section and a rear section; a diameter of the front section is smaller than a diameter of the rear section.

16. The laser-pointing device as claimed in claim 15, wherein an outer wall of the front housing is provided with an annular projection corresponding with the rear section.

* * * * *